United States Patent [19]

Schultz

[11] Patent Number: 4,662,772

[45] Date of Patent: May 5, 1987

[54] SHIFT LEVER TOWER ASSEMBLY

[75] Inventor: Donald C. Schultz, Toledo, Ohio

[73] Assignee: Dana Corporation, Toledo, Ohio

[21] Appl. No.: 796,119

[22] Filed: Nov. 8, 1985

[51] Int. Cl.[4] .......................... F16C 11/06; F16D 1/12
[52] U.S. Cl. .................................... 403/114; 403/128;
403/131; 403/125
[58] Field of Search ................. 403/114, 128, 131, 58,
403/125; 74/473 P

[56] References Cited

U.S. PATENT DOCUMENTS

| | | | |
|---|---|---|---|
| 499,525 | 6/1893 | Dodge | 403/122 X |
| 2,905,492 | 9/1959 | Alexander | 403/130 |
| 3,850,047 | 11/1974 | Davis | 403/133 X |
| 4,285,250 | 8/1981 | Ui et al. | 74/473 P |
| 4,333,360 | 6/1982 | Simmons | 403/114 X |
| 4,355,543 | 10/1982 | Ikemoto | 74/473 P |
| 4,457,188 | 7/1984 | Hauser | 403/114 X |
| 4,519,268 | 5/1985 | Oda | 248/181 X |

Primary Examiner—Andrew V. Kundrat
Attorney, Agent, or Firm—Marshall & Melhorn

[57] ABSTRACT

A shift lever tower assembly includes a spherical inner bearing with a central aperture formed therein for attachment to the shift lever, a spherical intermediate bearing having a hollow interior and inwardly extending projections for cooperating with slots formed in the outer surface of the inner bearing, and an outer bearing having a hollow interior with slots formed therein for cooperating with outwardly extending projections formed on the exterior of the intermediate bearing. The slots and projections are spaced such that the slot/projection combination of the inner and intermediate bearings limits movement of the shift lever in the fore and aft direction and the slot/projection combination of the intermediate and outer bearings limits shift lever movement to the side to side direction. The bearings are enclosed by a housing having slots formed on an interior thereof cooperating with outwardly extending projections formed on the outer bearing to prevent movement of the shift lever and bearing assembly in any direction other than the desired directions. The bearings can be formed of a thermoplastic material to increase shifting efficiency.

18 Claims, 5 Drawing Figures

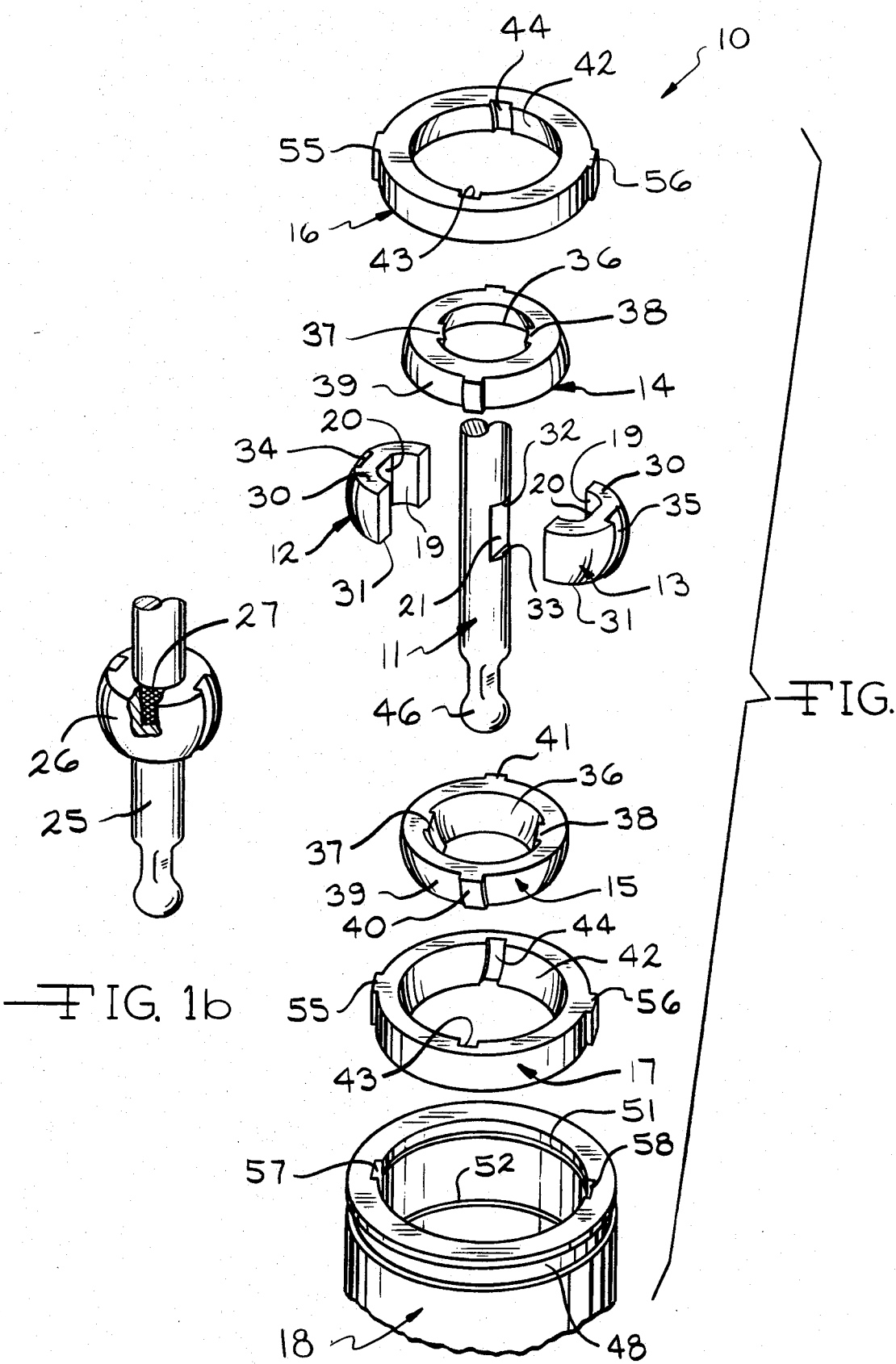

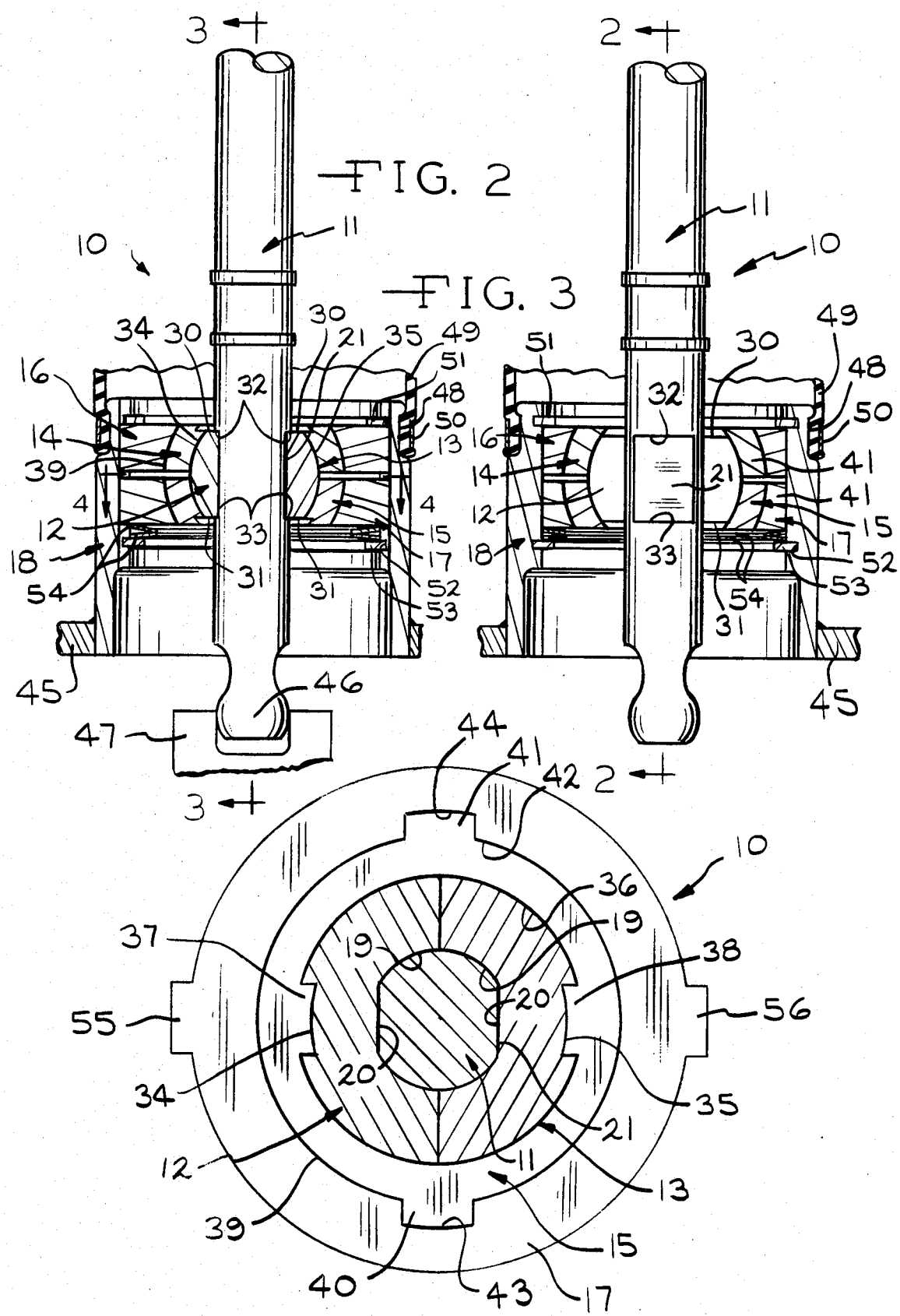

SHIFT LEVER TOWER ASSEMBLY

BACKGROUND OF THE INVENTION

The present invention relates, in general, to shift lever tower assemblies and, in particular, to an assembly for limiting the movements of a vehicle shift lever to fore and aft and side to side.

The use of a spherical ball or bushing attached to a shift lever and received in a spherical race is well known in the prior art. Furthermore, it is well known to utilize a pin and a slot to limit the movement of the shift lever in the desired directions or shift pattern. For example, U.S. Pat. Nos. 3,850,047; 4,285,250; and 4,355,543 disclose the use of one or more pins mounted in the race and engaging complimentary slots formed in the spherical ball or bushing on the shift lever to limit the movement of the shift lever. Conversely, U.S. Pat. Nos. 4,333,360 and 4,457,188 disclose one or more pins extending from a spherical ball or bushing to engage complimentary slots formed in the spherical race of the bearing to limit movement.

SUMMARY OF THE INVENTION

The present invention relates a shift lever tower assembly incorporating a unique spherical bearing assembly for providing both fore and aft and side to side movement of a shift lever, but preventing rotative movement of the shift lever. The spherical bearing assembly includes an inner, an intermediate and an outer bearing portion, all of which can be formed of a thermoplastic material. The inner bearing portion can be formed as two half spheres, or a single sphere with an aperture in the center for accepting the shift lever. In an alternate embodiment, the inner bearing can be molded as a unitary structure on a knurled area of the shift lever. The outer spherical surface of the inner bearing has a pair of diametrically opposed slots formed therein extending generally in a direction parallel to the longitudinal axis of the central aperture. The intermediate bearing portion has a hollow interior which is provided with an inner spherical race surface which slideably engages the outer surface of the inner bearing portion. The inner surface is provided with diametrically opposed, radially inwardly extending arcuate projections which engage the cooperating slots formed in the inner bearing.

The outer surface of the intermediate bearing is spherical with a pair of diametrically opposed arcuate projections formed thereon and positioned ninety degrees from the radially inwardly extending arcuate projections. The outer bearing portion has a hollow interior with an inner spherical surface having a pair of diametrically opposed slots formed therein for accepting the arcuate projections extending outwardly from the intermediate bearing. One of the pairs of projection/slot combinations permits fore and aft movement of the shift lever while the other pair of the projection/slot combinations permits side to side movement of the shift lever. The outer bearing is attached to a housing mounted to the frame of the vehicle such that the cooperating projections and slots prevent rotational movement of the shift lever about its longitudinal axis.

BRIEF DESCRIPTION OF THE DRAWINGS

FIG. 1a is an exploded perspective view of a bearing assembly, the lower end of a shift lever and housing of a shift lever tower assembly in accordance with the present invention;

FIG. 1b is a perspective view of the lower end of a shift lever and an inner bearing in accordance with an alternate embodiment of the present invention;

FIG. 2 is a side elevational view, taken as if in cross section along the line 2—2 of FIG. 3, showing the shift lever tower assembly of FIG. 1a in assembled form;

FIG. 3 is a side elevational view, taken as if in cross section along the line 3—3 of FIG. 2; and FIG. 4 is an enlarged plan view taken as if in cross section along the line 4—4 of FIG. 2.

DESCRIPTION OF THE PREFERRED EMBODIMENT

Referring to FIGS. 1a and 2 through 4, there is shown a shift lever tower assembly 10 according to the present invention. In FIG. 1a, the assembly 10 surrounds a lower end 11 of a shift lever, and includes two halves 12 and 13 of an inner bearing, two halves 14 and 15 of an intermediate bearing, two halves 16 and 17 of an outer bearing, and a tower or bearing housing 18. These elements are shown in assembled form in FIG. 2 and FIG. 3.

The inner bearing halves 12 and 13 are substantially identical. Each is one half of a sphere and together they define a central aperture 19 having a pair of planar surfaces or flats 20 formed on a wall thereof. The aperture 19 is dimensioned to accept the shaft of the shift lever 11 as shown in FIG. 1a. A flat 21 is formed on the shift lever 11 to cooperate with the one of the flats 20 formed in the inner bearing half 13. A similar flat (not shown) is formed on the opposite side of the shift lever lower end 11 to cooperate with the other one of the flats 20 formed in the inner bearing half 12. Thus, when the inner bearing halves 12 and 13 are assembled onto the shift lever lower end 11, the flats on the bearing halves cooperate with the flats on the shaft to prevent relative rotation between the inner bearing and the shift lever 11.

Alternatively, the inner bearing halves 12 and 13 could be formed as a single unit. Then, the flat 21 and the flat (not shown) on the opposite side of the shift lever 11 could be extended to the lower end of the shift lever 11. The inner bearing could be slipped onto the lower end of the shift lever 11 and moved upward to engage the upper side of the flat 21.

In another embodiment shown in FIG. 1b, a shift lever lower end 25 has a unitary spherical inner bearing 26 attached thereto. The shift lever 25 can have a knurled area 27 formed thereon such as, for example, a diamond knurl. The bearing 26 can be formed with a central aperture and pressed onto the knurled area 27. Alternatively, the bearing 26 can be formed from a plastic material and molded onto the lever 25.

Each of the inner bearing halves 12 and 13 has generally planar upper and lower surfaces 30 and 31 respectively which are formed generally perpendicular to the longitudinal axis of the central aperture 19. The planar surfaces 30 and 31 engage the upper and lower edges 32 and 33 respectively of the flat 21 formed in the shift lever lower end 11. Thus, the planar surfaces 30 and 31 and the upper edge 32 and lower edge 33 cooperate to prevent relative movement between the shift lever 11 and the inner bearing halves 12 and 13 in a direction parallel to the longitudinal axis of the shift lever.

The shift lever inner bearing halves 12 and 13 have a pair of slots 34 and 35 respectively formed in the outer bearing race surfaces thereof. The slots 34 and 35 extend parallel to the longitudinal axis of the central aperture 19 and are generally arcuate in shape. The intermediate bearing halves 14 and 15 and the outer bearing halves 16 and 17 form a support bearing for the inner bearing.

The intermediate bearing halves 14 and 15 are similar in structure and cooperate to define a hollow interior having an inner spherical bearing surface 36. Formed on the inner bearing surface 36 of each of the intermediate bearing halves 14 and 15 are a pair of diametrically opposed, radially inwardly extending acruate projections 37 and 38. The projections 37 and 38 cooperate with the slots 34 and 35 respectively to limit relative rotation between the inner bearing halves 12 and 13 and the intermediate bearing halves 14 and 15 in a generally vertically extending plane which can be, for example, the plane which defines the pivotal movement of the shift lever in the fore and aft directions when mounted in a vehicle.

The intermediate bearing halves 14 and 15 also have an outer spherical bearing surface 39. Projecting from the outer bearing surface 39 are a pair of diametrically opposed, radially outwardly extending arcuate projections 40 and 41. The projections 40 and 41 extend in a plane perpendicular to the plane of the projections 37 and 38 such that the four projections are spaced approximately ninety degrees apart about the intermediate bearing. The outer bearing halves 16 and 17 have a hollow interior with a spherical inner bearing surface 42 which is the compliment of the outer spherical bearing surface 39 of the intermediate bearing halves 14 and 15. Each of the outer bearing halves 16 and 17 has a pair of slots 43 and 44 formed therein. The slots 43 and 44 accept the projections 40 and 41 respectively and limit relative motion between the intermediate bearing halves 14 and 15 and the outer bearing halves 16 and 17 to a generally vertical plane in a side to side direction for the shift lever 11.

The entire bearing assembly is mounted in the tower or bearing housing 18. The housing 18 is tubular in shape and is attached to a frame 45 of the vehicle as shown in FIG. 2 and FIG. 3 by suitable means such as welding. As shown FIG. 2, the shift lever lower end 11 terminates in a tang portion 46 which may engage a portion 47 of a shifting mechanism for vehicle transmission (not shown). The bearing housing 18 includes a circumferential groove 48 formed about an upper end thereof. As shown in FIG. 2 and FIG. 3, a boot or dust cover 49 has an opening which receives the open end of the housing 18 and is secured in the groove 48 by a band 50 which can be a cable tie or a similar device. Although, not shown, the upper end of the boot 49 is secured to the shift lever 11 to prevent dust and dirt from entering the bearing housing 18 and the transmission shifting mechanism 47.

As shown in FIG. 1a, the bearing housing 18 has an upper snap ring groove 51 and a lower snap ring groove 52 formed on a interior wall thereof. As shown in FIG. 2 and FIG. 3, a snap ring 53 engages the lower snap ring groove 52 to form an inwardly extending flange. The snap ring 53 forms a seat for a pair of disc or Bellville spring washers 54. The disc spring washers 54 support the bearing assembly comprising the inner bearing halves 12 and 13, the intermediate bearing halves 14 and 15, and the outer bearing halves 16 and 17. The spring washers 54 tend to isolate the shift lever 11 from vibration generated by the vehicle engine and transmitted through the vehicle frame. The outer diameter of the outer bearing halves 16 and 17 is slightly smaller than the inner diameter of the bearing housing 18 for a snug fit. The outer bearing halves 16 and 17 each have a pair of diametrically opposed, radially outwardly extending projections 55 and 56 formed thereon. The projections 55 and 56 cooperate with a pair of slots 57 and 58 formed in the inner wall of the bearing housing 18 and extending substantially parallel to the longitudinal axis of the housing. The projections 55 and 56 and the slots 57 and 58 prevent the bearing assembly from rotating about the longitudinal axis of the bearing housing 18. A snap ring 59 engages the upper snap ring groove 51 to retain the bearing assembly in the housing.

The inner, intermediate and outer bearings can be injection molded from a suitable thermoplastic material having a Teflon filler material. The bearing assembly according to the present invention tends to increase shifting efficiency by reducing friction. It also tends to eliminate annoying shifting lever rattle and to eliminate oil leaks which are common with the prior art pin and slot constructions.

It should be noted that the shift lever tower assembly of the present invention has been illustrated and described in what is considered to represent its preferred embodiment. However, it should be noted that the invention may be practiced otherwise as specifically illustrated and described without departing from the spirit or scope of the attached claims.

What is claimed is:

1. A shift lever bearing assembly for supporting a shift lever comprising:
    an inner bearing having means for attachment to a shaft of a shift lever and having a generally spherical outer surface;
    an intermediate bearing having a hollow interior partially enclosing said inner bearing and defined by a generally spherical inner surface cooperating with said outer surface of said inner bearing, and further having a generally spherical outer surface;
    one of said inner bearing outer surface and said intermediate bearing inner surface provided with at least a first slot formed therein and the other one of said inner bearing outer surface and said intermediate bearing inner surface having at least one first projection formed thereon cooperating with said first slot to limit relative movement between said inner bearing and said intermediate bearing to a signle plane;
    an outer bearing having a hollow interior with a generally spherical inner surface cooperating with said intermediate bearing outer surface; and
    one of said intermediate bearing outer surface and said outer bearing inner surface provided with at least one second slot formed therein and the other one of said intermediate bearing outer surface and said outer bearing inner surface having at least one second projection formed thereon cooperating with said second slot to limit relative movement between said intermeidate bearing and said outer bearing to a plane different from said single plane.

2. The bearing assembly according to claim 1 wherein said inner bearing has a pair of diametrically opposed first slots formed in said outer surface and wherein said intermediate bearing has a pair of diametrically opposed inwardly extending first projections formed thereon, each of said first projections cooperating with one of said first slots to limit said relative movement to said single plane.

3. The bearing assembly according to claim 2 wherein said first slots and said first projections are formed with longitudinal axes in a plane including the longitudinal axis of a shift lever shaft when said bearing assembly is attacted to a shaft of a shift lever.

4. The bearing assembly according to claim 1 wherein said inner bearing has an aperture formed therethrough for accepting the shaft of a shift lever, an inner wall of said aperture and the shaft having said means for attachment formed thereon.

5. The bearing assembly according to claim 4 wherein said attachment means includes at least one planar surface formed on a wall of said inner bearing aperture for cooperating with a planar surface formed on the shaft a shift lever.

6. The bearing assembly according to claim 4 wherein said attachment means includes a knurled surface formed on the shaft of a shift lever and a cooperating surface formed on a wall of said aperture frictionally engaging said knurled surface.

7. The bearing assembly according to claim 6 wherein said inner bearing is made from a plastic material and is molded about said knurled surface.

8. A shift lever bearing assembly for supporting a shift lever comprising:
an inner bearing having means for attachment to a shaft of a shift lever and having a generally spherical outer surface with at leat one slot formed therein;
a support bearing having a hollow interior partially enclosing said inner bearing and defined by a generally spherical inner surface cooperating with said outer surface of said inner bearing, said inner surface having at least one inwardly extending projection formed thereon cooperating with said slot to limit relative movement between said inner bearing and said support bearing to a single plane; and
said support bearing provided with at least one outwardly extending projection formed on an exterior surface thereof for attachment to a bearing housing.

9. The bearing assembly according to claim 8 including a generally tubular bearing housing having at least one slot formed on an interior wall thereof for accepting said support bearing projection.

10. A shift lever bearing assembly for supporting a vehicle shift lever in a housing comprising:
an inner bearing adapted to be attached to a shaft of a shift lever and having a generally spherical outer surface with at least one slot formed therein;
an intermediate bearing having a hollow interior with a generally spherical inner surface cooperating with said outer surface of said inner bearing, said inner surface having at least one inwardly extending projection formed thereon cooperating with said inner bearing slot to limit relative movement between said inner bearing and said intermediate bearing to a first plane, said intermediate bearing haivng a generally spherical outer surface with at least one outwardly extending projection formed thereon; and
an outer bearing having a hollow interior with a generally spherical inner surface cooperating with said intermediate bearing outer surface, said outer bearing inner surface having at least one slot formed therein for cooperating with said intermediate bearing outwardly extending projection to limit relative movement between said intermediate bearing and said outer bearing to a second plane.

11. The bearing assembly according to claim 10 including a housing for enclosing said inner intermediate and out bearings.

12. The bearing assembly according to claim 11 wherein said housing is tubular in shape and includes a pair of slots formed on an interior wall thereof and wherein said outer bearing has a pair of outwardly extending projections formed on an exterior surface thereof for engaging said slots in said housing.

13. The bearing assembly according to claim 11 wherein said housing is tubular in shape and includes a radially extending groove formed in an interior wall thereof and wherein said bearing assembly includes a snap ring for engaging said groove to form an inwardly extending flange for supporting said outer bearing in said housing.

14. The bearing assembly according to claim 13 including at least one spring washer positioned between said snap ring and said outer bearing.

15. The bearing assembly according to claim 13 wherein said housing includes a second radially extending groove formed in said interior wall and said bearing assembly include a second snap ring for engaging said second groove to form an inwardly extending second flange, said flanges being spaced apart for retaining said outer bearing therebetween in said housing.

16. A bearing assembly for controlling the movement of a lever comprising:
an inner bearing having means for attachment to a lever and a generally spherical outer surface with a pair of diametrically opposed slots formed therein;
an intermediate bearing having a hollow interior with a generally spherical inner surface slideably cooperating with said inner bearing outer surface and a pair of inwardly extending projections formed on said inner surface and cooperating with said inner bearing slots to limit relative movement between said inner bearing and said intermediate bearing to a first plane, said intermediate bearing having a generally spherical outer surface with a pair of diametrically opposed outwardly extending projections formed thereon;
an outer bearing having a hollow interior with a generally spherical inner surface slideably cooperating with said intermediate bearing outer surface, said outer bearing inner surface having a pair of diametrically opposed slots formed therein for cooperating with said intermediate bearing outwardly extending projections to limit relative movement between said intermediate bearing and said outer bearing to a second plane different than said first plane, and a pair of diametrically opposed outwardly extending projections formed on an exterior surface of said outer bearing; and
a generally tubular bearing housing having a pair of diametrically opposed slots formed in an interior wall thereof for retaining said outer bearing outwardly extending projections, said bearing housing enclosing said inner intermediate and outer bearings.

17. The bearing assembly according to claim 16 wherein said inner bearing slots and said intermediate bearing inwardly extending projections are located ninety degrees from said intermediate bearing outwardly extending projections and said outer bearing slots about an axis of rotation of said intermediate bearing.

18. The bearing assembly according to claim 16 wherein said means for attachment includes an aperture formed along an axis of rotation through said inner bearing for accepting a lever.

* * * * *